United States Patent Office 3,535,934
Patented Oct. 27, 1970

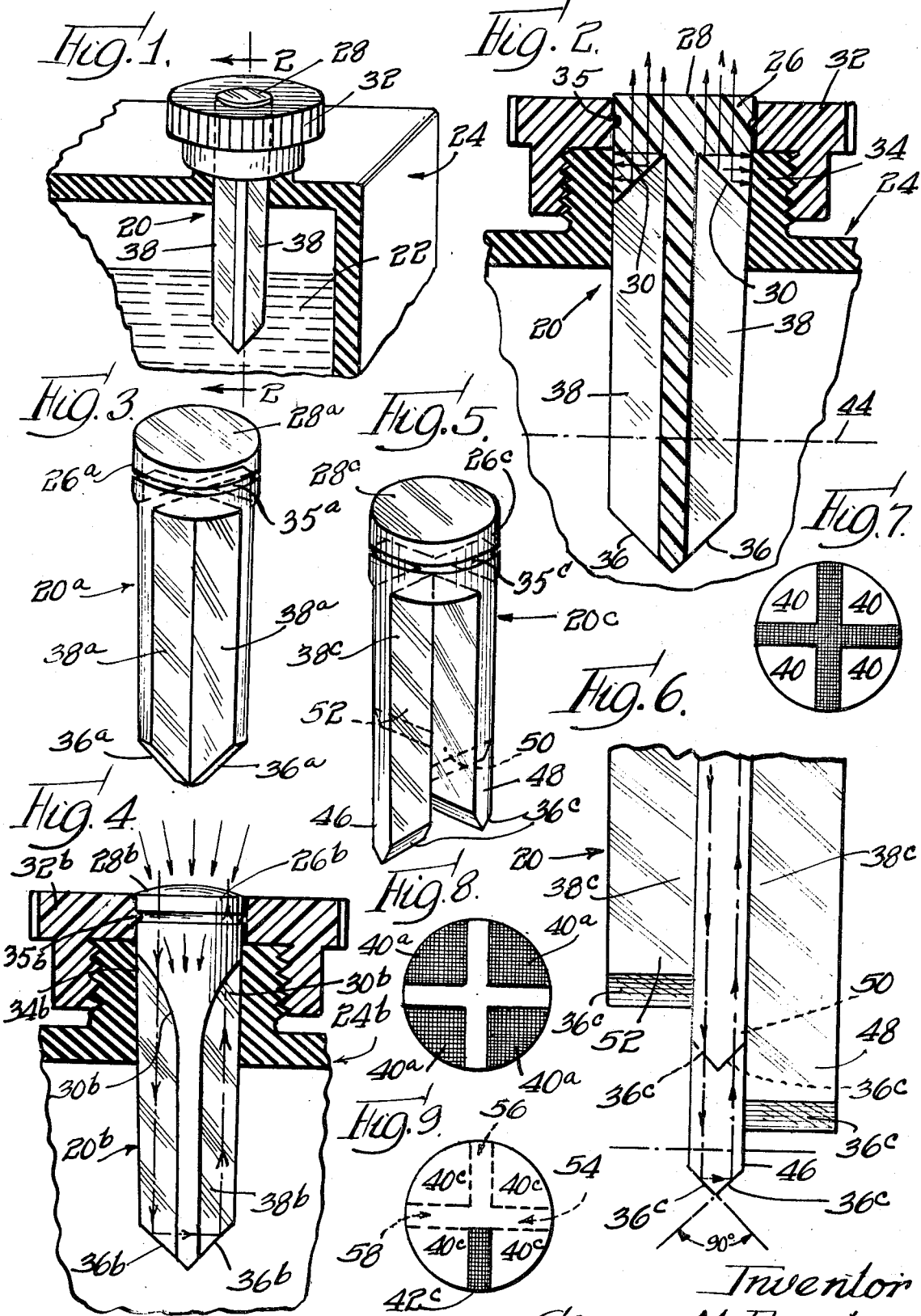

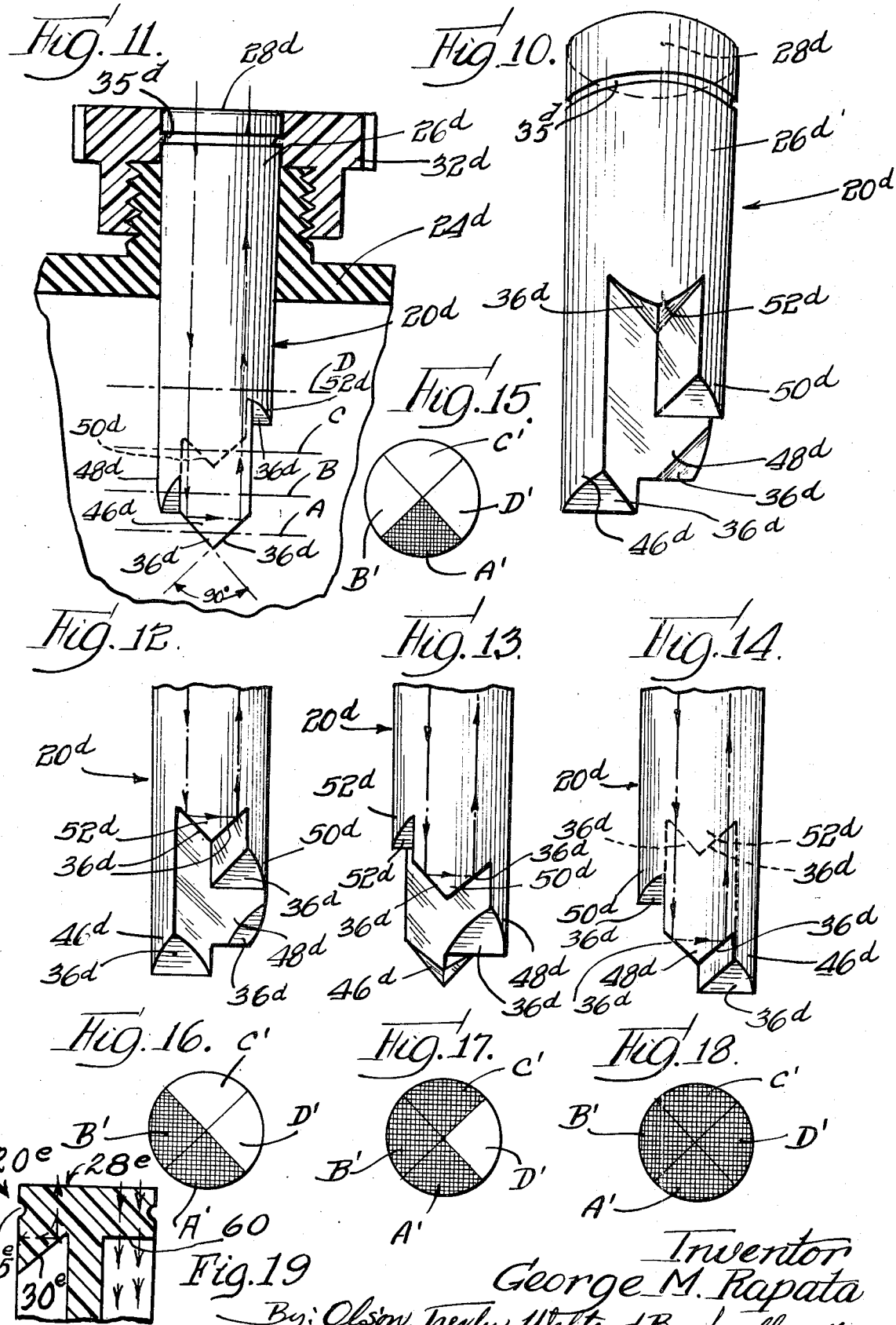

3,535,934
LIQUID LEVEL INDICATOR
George M. Rapata, Park Ridge, Ill., assignor to Illinois Tool Works Inc., Chicago, Ill., a corporation of Delaware
Filed Feb. 10, 1969, Ser. No. 798,010
Int. Cl. G01f 23/02
U.S. Cl. 73—327                                3 Claims

ABSTRACT OF THE DISCLOSURE

An indicator for indicating levels of liquid subject to fluctuation comprising an elongate member of light transmitting material adapted to be supported by the upper wall of a container such as a storage battery. The lower portion of the indicator is immersible within liquid of the container and the upper portion provides an exposed liquid level indicating surface. The lower extremity of the indicator body includes a plurality of circumferentially oriented vanes, the lower ends of which have pairs of surfaces intersecting at an angle of 90°, each of said pairs of surfaces being so disposed with respect to the upper level indicating surface as to receive and reflect light only on the portion of said pairs located above the level of an associated body of liquid. Separating the upper portions of the vanes are frustoconical light receiving and reflecting surfaces.

---

The present invention contemplates the provision of an improved liquid level indicator of the type comprising an elongated body of light transmitting material and more particularly to a liquid level indicator which may be very economically produced and which is adapted to indicate varations in liquid level by radially or circumferentially oriented shaded areas on an exposed light receiving surface.

More specifically, the present invention contemplates an indicator of the type mentioned above in which the body of the indicator includes a plurality of radially oriented light receiving and reflecting surfaces which are so disposed with respect to an upper exposed liquid level indicating surface as to receive and reflect light on only those portions of said radially oriented surfaces which are located above the level of an associated body of liquid.

It is a further object of the present invention to provide a liquid level indicator as set forth above wherein the degree of level of liquid will be indicated in the form of a shaded quadrant or an arm or arms of a cross.

The foregoing and other objects and advantages will be more apparent from the following detailed description, when considered in connection with the accompanying drawings, wherein:

FIG. 1 is a perspective view of one embodiment of a liquid level indicator of the type contemplated by the present invention, said indicator being shown in association with the upper wall of a container such as a storage battery;

FIG. 2 is an enlarged vertical sectional view taken substantially along the line 2—2 of FIG. 1;

FIG. 3 is a perspective view of an indicator similar to that disclosed in FIGS. 1 and 2, having a flat undersurface beneath and substantially parallel with the exposed indicating surface, as compared with the frustoconical undersurface of the indicator shown in FIG. 2;

FIG. 4 is a view similar to FIG. 2, illustrating a level indicator in elevation having a further modified form of undersurface located beneath the exposed level indicating surface;

FIG. 5 is a further modified form of indicator having a body portion of cruciform cross-section similar to that shown in FIGS. 1-4 inclusive, and a modified entering end structurally arranged to enable indication of levels on the upper indicator surface in the form of one or more arms of a cross;

FIG. 6 is an enlarged fragmentary side elevational view of the immersible portion of the indicator shown in FIG. 5;

FIG. 7 discloses the shaded cruciform area which will appear on the upper indicator surface when the level of the liquid within the container is above the lower tapered extremity of the indicator of FIG. 2;

FIG. 8 discloses the shaded area in the form of quadrants which will appear on the upper indicator surface when the liquid level with which the indicator of FIG. 5 is associated is below the lower extremity of the indicator;

FIG. 9 indicates the shaded area in the form of one arm of a cross which will appear when the level of the liquid is as indicated in FIG. 6;

FIG. 10 is an enlarged perspective view of a further modfied form of indicator in which the lower portion of the indicator is divided into four circumferentially oriented elements disposed at different levels;

FIG. 11 discloses the indicator of FIG. 10 in operative association with the upper wall of a storage battery;

FIG. 12 is a fragmentary elevational view of the lower portion of the indicator shown in FIG. 11, said view being taken from the right of FIG. 11;

FIG. 13 is a fragmentary elevational view of the lower portion of the indicator shown in FIG. 11 as viewed from the right of FIG. 12;

FIG. 14 is a fragmentary elevation view of the lower portion of the indicator of FIG. 11 as viewed from the right of FIG. 13;

FIG. 15 is a plan view of the upper indicator surface of the indicator of FIG. 11 when the level of the liquid in the container is at the position indicated by the lowermost horizontal dot-and-dash line in FIG. 11;

FIG. 16 is a view similar to FIG. 15 when the level of the liquid in the container occupies the position shown on the horizontal dot-and-dash line second from the bottom of FIG. 11;

FIG. 17 is a view similar to FIGS. 15 and 16 when the level of the liquid in the container is positioned as indicated by the horizontal dot-and-dash line third from the bottom of FIG. 11;

FIG. 18 is a view similar to FIGS. 15–17 inclusive when the level of the liquid is at the position indicated by the uppermost horizontal dot-and-dash line in FIG. 11; and FIG. 19 is a vertical sectional fragmentary view of another modified form of indicator.

Referring now to the drawings wherein like numerals have been employed to designate similar parts throughout the various figures, it will be seen that one embodiment of a liquid level indicator contemplated by the present invention is shown in FIGS. 1 and 2. The indicator is designated generally by the numeral 20. The indicator 20 is unitarily formed of light transmitting material and includes a lower extremity of cruciform shape in cross-section, adapted to be immersed within a body of liquid 22 within a container or storage battery 24. An upper portion or section 26 of the indicator 20 provides a substantially horizontal light receiving indicator surface 28. It will be noted that the underside of the section 26 is countersunk to provide light receiving and reflecting surfaces 30 disposed at 45° with respect to the plane coincident with the indicator surface 28.

In the disclosed embodiment, the indicator 20 is mounted within an internally threaded closure member or cap 32 adapted to be received by a complementary threaded neck 34 extending upwardly from and formed integrally with the upper wall of the container or storage battery 24. The indicator member 20 may be secured against axial displacement with respect to the cap 32 by any suitable means, as for example the annular rib and groove arrangement 35, FIG. 2. Obviously, if desired, the rib may be formed on the periphery of the indicator member and the groove in the cap. The cap and indicator member may be longitudinally snapped into assembled relation.

The lower extremity of the indicator member 20 is provided with light receiving and reflecting surfaces 36 formed at the lower extremity of each of the elongate four wings or arms 38 which form the immersible portion of the indicator body. Assuming that the wings are not immersed within a body of liquid, it will be understood that light rays received by the indicator surface 28 will be directed downwardly within each wing 38 to its complementary angular surface 36. Diametrically opposed surfaces 36 are disposed at 90° with respect to each other and therefore light rays received on one of the surfaces 36 will be directed horizontally to the oppositely disposed surface 36 and then returned upwardly to the indicator surface 28. As the lower tip of the indicator 20 becomes immersed within the body of liquid 22, the immersed portions of the surfaces 26 will cease to reflect light rays to the indicator surface 28 and hence will produce a cruciform darkened design on said surface, which may be viewed from above. When the level of the liquid reaches the level indicated in FIG. 1, and by the dot-and-dash line in FIG. 2, the shaded cruciform figure will be clearly distinguishable on the exposed indicator surface 28.

The frustoconical quadrants or surfaces 30 will receive the light rays from the surface 28 and deflect those rays radially outwardly to the periphery of the section 26. This periphery is preferably provided with a polished reflective surface having a given color, which color will be reflected back to the surfaces 30 and thence upwardly to the surface 28. The quadrants to which this shade of color will be received by the indicator surface 28 from the aforesaid polished surface are designated by the numeral 40 (FIG. 7). The shaded or darker cruciform figure is designated by the numeral 42.

From the foregoing, it will be apparent that by visual inspection when the indicator 20 becomes submerged within the liquid of the container to a point above the angularly disposed surfaces 36, so as to produce a complete cruciform shape of the indicator surface 28, the container or storage battery will be adequately supplied with liquid. The horizontal dot-and-dash line indicating the liquid level in FIG. 2 is designated by the numeral 44.

In FIG. 3, a slightly modified form of indicator is disclosed and is designated generally by the numeral 20a. The only structural difference between indicator 20a and indicator 20 is that the underside or surface of the section 26a of the indicator 20a is parallel with the indicator surface 28a. All elements of the indicator 20a which conform structurally with the elements of the previously described indicator 20 are given corresponding numerals bearing the suffix a. When the surface of the liquid in the container with which the indicator 20a may be associated is below the lower extremity thereof, four dark or shaded quadrant areas 40a will appear on the surface 28a as clearly indicated in FIG. 8. Light rays from the surface 28a will be received by and reflected from the angularly disposed surfaces 36a as previously described, and hence such light rays will cause a cruciform figure to appear on the surface 28a. As the level rises in the container to a point above the surfaces 36a, the entire indicator surface 28a will be darkened thereby indicating that the desired level of fluid in the container has been reached.

FIG. 4 discloses a further modified form of indicator designated generally by the numeral 20b. The indicator 20b is very similar to the indicator 20a shown in FIG. 3, the only essential difference being in the use of arcuate surfaces 30b beneath the upper section 26b. The arcuate surfaces 30b tend to cooperate in concentrating light rays received by the upper indicating surface 28b into the vanes or arms 38b as indicated by the directional arrows in FIG. 4. In some instances it may be desirable to have a slightly curved upper level indicating surface as shown in FIG. 4. Other structural portions of the indicator 20b corresponding with structures previously described are indicated by numerals bearing the suffix b. The indicator 20b functions the same as the indicator 20a in reflecting a cruciform area on the surface 28b when the level within the container 24b is below the lower extremity of the indicator. As the level of the liquid rises above the surfaces 36b, the entire area of the surface 28b will be darkened.

FIG. 5 discloses a still further modified form of indicator, designated generally by the numeral 20c. The indicator 20c has an upper section 26c which provides a level indicating surface 28c. A plurality of radial vanes or fins 38c extend downwardly from the underside of the section 26c. Particular attention is directed to the fact that the lower extremities of the fins 38c terminate a different levels. The lowermost extremity is designated by the numeral 46. Following in counterclockwise order as viewed in FIG. 5, the next lowermost extremity 48 is positioned above extremity 46 and the extremity 50 is positioned above the extremity 48, whereas the fourth terminal 52 is positioned above the extremity 50. The extremities 46, 48, 50 and 52 each include a pair of surfaces 36c which intersect at 90° along a line normal to the axis of the indicator and parallel to the level indicating surface 28c. Thus as light rays pass downwardly from the surface 28c through the wings 38c to their respective intersecting surfaces 36c, light rays from one of the surfaces 36c will be directed horizontally to the opposite surface and then reflected by the latter surface back to the level indicating surface 28c.

In FIG. 6 an enlarged elevational view of the immersible or lower portion of the indicator 20c illustrates the manner in which the light rays are received from and reflected to the level indicating surface 28c by the intersecting surfaces 36c. This of course assumes that the surfaces 36c of all of the extremities 46, 48, 50 and 52 are above the level of the liquid in the container.

It is desirable to form the undersurface of the section 26c of the indicator 20c in a manner similar to the undersurfaces 30 previously described in connection with the disclosure in FIG. 2. By this arrangement, the four quadrants 40c as shown in FIG. 9 reflect a light shade corresponding with the shade of the peripheral polished surface of the upper section 26c, thereby establishing a sharper contrast with the heavier shaded area located between the quadrants 40c. When the level of the liquid with which the indicator 20c is associated is positioned as indicated by the horizontal dot-and-dash line in FIG. 6, the darker area 42c of the cruciform shape will appear as shown in FIG. 9. In other words, only one of the extremities, namely the extremity 46 is submerged and hence the remaining extremities 48, 50 and 52 will receive and reflect light rays. When the level of the liquid rises above the dot-and-dash line of FIG. 6 to the point above the extremity 48, a second area indicated by the arrow 54 will appear to be darkened on the level indicating surface 28c (FIG. 9) and likewise as the level rises above the extremity 50 an area 56 will be darkened, and finally as the liquid level rises to the extremity 52 the area 58 will be darkened, thus presenting a complete darkened cruciform shape similar to that shown in FIG. 7.

In FIGS. 10–14 inclusive, a still further modified liquid level indicator is disclosed which is designated generally by the numeral 20d. The upper section 26d of the indicator 20d may be mounted as previously described within a closure cap 32d associated with the upper wall of a container or storage battery 24d. The lower immersible portion of the level indicator 20d is provided with a series of four sections or extremities designated by the numerals 46d, 48d, 50d and 52d. These sections 46d to 52d inclusive are circumferentially oriented with respect to the periphery of the indicator 20d and are located at various levels.

Thus the section 46d is the lowermost one and next in order, positioned above the section 46d, are the sections 48d, 50d and 52d respectively. As clearly shown in FIGS. 10–14, inclusive, the lower extremity of each of the sections 46d, 48d, 50d and 52d are defined by a pair of light receiving and reflecting surfaces 36d, which intersect along a line parallel with the upper light receiving and indicating surface 28d substantially normal to the axis of the indicator. The included angle of each pair of surfaces 36d is 90° as shown in FIG. 11.

Assuming that the lower extremity of the indicator member 20d is above the level of fluid in the container 24d, it will be understood that each pair of intersecting surfaces 36d associated with their respective sections 46d, 48d, 50d and 52d will receive light rays from and will reflect light rays to the indicator surface 28d. Lines with indicating arrows in FIGS. 11–14 inclusive illustrate the manner in which the aforesaid intersecting surfaces 36d receive light rays from and reflect light rays to the surface 28d.

If the liquid within the container 24d is at a level indicated by the dot-and-dash line A of FIG. 11, the portion of the lowermost section 46d immersed within the liquid will cause a darkened area or quadrant A' to appear upon the indicating surface 28d as shown in FIG. 15. FIG. 15 is a view taken from above the surface 28d. At this time the remaining quadrants indicated by the letters B', C', and D' are light in shade due to the fact that these quadrants receive light rays reflected from the complementary intersecting surfaces 36d positioned therebeneath. Likewise when the liquid in the container is at the position B of FIG. 11, the darkened quadrants will appear as A' and B' as shown in FIG. 16. When the liquid level is at the dot-and-dash line C of FIG. 11, three quadrants, namely A', B', and C' will be dark when viewed from above the indicator surface, as shown in FIG. 17. When the liquid in the container or storage battery has reached its desired height, as indicated by the dot-and-dash line D of FIG. 11, all of the quadrants 46d, 48d, 50d and 52d will be darkened as shown in FIG. 18.

It will be understood that instead of employing four frustoconical surfaces 30, as indicated in FIG. 2, the number of such surfaces or quadrants could be limited to two. The remaining two quadrants may be defined by surfaces 60 extending normal to the indicator axis as illustrated in FIG. 19. The latter two quadrants would allow light rays to pass through and be absorbed by the liquid in the container or tank. This arrangement would make a three color read out. That is to say, the quadrants having the two frustoconical surfaces 30e could reflex differing shades of color and the remaining two would be darkened because of the absorption of the light rays by the liquid in the container. This of course assumes that the indicator is immersed within the liquid.

From the foregoing, it will be apparent that the present invention provides a very simple and economical device for indicating various levels of liquid within a container by geometrical shapes in the form of cruciform areas or quadrant areas. All of the various forms of indicators disclosed herein may be produced by practicing conventional plastic molding methods. While for purposes of disclosure a container in the form of a storage battery is illustrated, it should be understood that the liquid level indicator contemplated by the present invention may be used with various forms of containers capable of supporting in the upper wall thereof an elongate member of light transmitting material of the type contemplated by the present invention wherein the lower portion is immersible within the liquid and the upper portion provides an exposed liquid level indicating surface.

The invention is claimed as follows:

1. A level indicator for indicating levels of liquid subject to fluctuation, comprising a unitary elongated member of light transmitting material, including a lower portion immersible within liquid and an upper portion providing an exposed liquid level indicating surface, said lower portion including a plurality of circumferentially oriented vanes, the lower extremities of said vanes including pairs of downwardly extending intersecting surfaces defining an included angle of 90°, the underside of the exposed indicating surface being provided with frustoconical light receiving and reflecting surfaces which separate the upper portion of said vanes, the lower portion having a transverse cross section of a generally cruciform configuration, said pairs of intersecting surfaces being variably spaced downwardly from said exposed liquid level indicating surface, whereby light received through the indicating surface passes downwardly through the vanes and is reflected through the indicating surface from only the portion of said pairs of surfaces located above the level of an associated body of liquid.

2. A level indicator for indicating levels of liquid subject to fluctuation as set forth in claim 1, wherein each of said pairs of downwardly extending surfaces intersect along a line substantially parallel with respect to the upper exposed liquid level indicating surface.

3. A level indicator for indicating levels of liquid subject to fluctuation as set forth in claim 1 wherein said pairs of surfaces intersect the longitudinal axis of the level indicator.

References Cited

UNITED STATES PATENTS

| | | | |
|---|---|---|---|
| 1,724,716 | 8/1929 | Kryzanowsky | 73—327 X |
| 3,362,224 | 1/1968 | Melone | 73—327 |
| 3,448,618 | 6/1969 | Lomolino | 350—96 X |
| 3,449,036 | 6/1969 | Jacobsen | 350—96 |

LOUIS R. PRINCE, Primary Examiner

D. M. YASICH, Assistant Examiner

U.S. Cl. X.R.

116—118; 136—182